US008697018B2

(12) United States Patent
Zones et al.

(10) Patent No.: US 8,697,018 B2
(45) Date of Patent: Apr. 15, 2014

(54) REDUCTION OF OXIDES OF NITROGEN IN A GAS STREAM USING MOLECULAR SIEVE SSZ-25

(75) Inventors: Stacey I. Zones, San Francisco, CA (US); Robert J. Saxton, Pleasanton, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 161 days.

(21) Appl. No.: 13/198,996

(22) Filed: Aug. 5, 2011

(65) Prior Publication Data

US 2013/0034483 A1 Feb. 7, 2013

(51) Int. Cl.
*B01D 47/00* (2006.01)
*C01B 33/36* (2006.01)

(52) U.S. Cl.
USPC ............ 423/210; 423/235; 423/700; 423/718

(58) Field of Classification Search
None
See application file for complete search history.

(56) References Cited

U.S. PATENT DOCUMENTS

| | | | | |
|---|---|---|---|---|
| 4,297,328 | A | 10/1981 | Ritscher et al. | |
| 4,826,667 | A * | 5/1989 | Zones et al. | 423/706 |
| 4,910,006 | A | 3/1990 | Zones et al. | |
| 5,202,014 | A | 4/1993 | Zones et al. | |
| 5,316,753 | A | 5/1994 | Nakagawa | |
| 5,785,947 | A | 7/1998 | Zones et al. | |
| 7,357,904 | B2 | 4/2008 | Zones et al. | |
| 7,442,354 | B2 | 10/2008 | Elomari | |
| 7,749,471 | B2 | 7/2010 | Yuen et al. | |
| 2007/0125077 | A1 * | 6/2007 | Wegst et al. | 60/299 |
| 2007/0134146 | A1 * | 6/2007 | Bull et al. | 423/239.2 |
| 2007/0202031 | A1 * | 8/2007 | Breuer et al. | 423/352 |

OTHER PUBLICATIONS

Subbiah, Ayyappan et. al. "NOx reduction over metal-ion exchanged novel zeolite under lean conditions: activity and hydrothermal stability". Applied Catalysis B: Enviromental 42, 155-178 (2003).*

S.I. Zones, S.-J. Hwang and M.E. Davis "Studies on the Synthesis of SSZ-25 Zeolite in a 'Mixed-Template' System" Chem. Eur. J. 2001, 7, 1990-2001.

PCT International Search Report, PCT/US2012/031955, mailed Oct. 29, 2012.

"Kirk-Othmer Encyclopedia of Chemical Technology" 1993, Fourth Edition, vol. 5, John Wiley & Sons, 406-407.

D.S.J. Jones and P.R. Pujado "Handbook of Petroleum Processing" 2006, Springer, 327-331.

* cited by examiner

*Primary Examiner* — Melvin C Mayes
*Assistant Examiner* — Sheng H Davis
(74) *Attorney, Agent, or Firm* — Terrence Flaherty; E. Joseph Gess

(57) ABSTRACT

The invention relates generally to molecular sieve SSZ-25 and its use in the reduction of oxides of nitrogen in a gas stream such as the exhaust from an internal combustion engine.

6 Claims, No Drawings

REDUCTION OF OXIDES OF NITROGEN IN A GAS STREAM USING MOLECULAR SIEVE SSZ-25

TECHNICAL FIELD

The invention relates generally to molecular sieve SSZ-25 and its use in the reduction of oxides of nitrogen in a gas stream.

BACKGROUND

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and, drying, hydrocarbon and chemical conversions, and other applications.

SUMMARY

In accordance with this invention, there is provided a process for the reduction of oxides of nitrogen contained in a gas stream wherein the process comprises contacting the gas stream with a crystalline molecular sieve having a mole ratio of an oxide selected from silicon oxide, germanium oxide and mixtures thereof to an oxide selected from aluminum oxide, gallium oxide, iron oxide, boron oxide and mixtures thereof greater than about 20:1. The molecular sieve has, after calcination, the X-ray diffraction lines of Table 2. The molecular sieve may contain a metal or metal ions (e.g., cobalt, copper, platinum, iron, chromium, manganese, nickel, zinc, lanthanum, palladium, rhodium or mixtures thereof) capable of catalyzing the reduction of the oxides of nitrogen, and the process may be conducted in the presence of a stoichiometric excess of oxygen. In one embodiment, the gas stream is the exhaust stream of an internal combustion engine.

DETAILED DESCRIPTION

The present invention comprises a molecular sieve designated herein "molecular sieve SSZ-25" or simply "SSZ-25." Molecular sieve SSZ-25 and methods of preparation are disclosed in U.S. Pat. Nos. 4,826,667; 5,202,014; and 5,785,947.

In preparing SSZ-25, an adamantane quaternary ammonium cation is used as a structure directing agent ("SDA"), also known as a crystallization template. SDAs useful for making SSZ-25 are represented by the following structures (1) and (2):

(1)

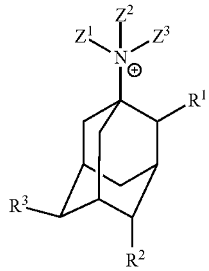

N,N,N-trialkyl-1-adamatanammonium cation

-continued (2)

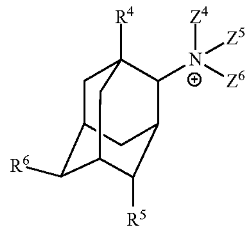

N,N,N-trialkyl-2-adamantanammonium cation wherein each of $Z^1$, $Z^2$, $Z^3$, $Z^4$, $Z^5$ and $Z^6$ independently is lower alkyl and most typically methyl; each of $R^1$, $R^2$, $R^3$, $R^4$, $R^5$ and $R^6$ independently is hydrogen or lower alkyl and most typically hydrogen. As used herein, the term "lower alkyl" refers to an alkyl group having from 1 to 5 carbon atoms.

The SDA cation is associated with an anion which can be any anion that is not detrimental to the formation of the SSZ-25. Representative anions include halogen (e.g., fluoride, chloride, bromide and iodide), hydroxide, acetate, sulfate, tetrafluoroborate, carboxylate, and the like. The SDA may be used to provide hydroxide ions. Thus, it can be beneficial to ion exchange, for example, a halide to hydroxide ion.

In general, SSZ-25 is prepared by contacting, in the presence of hydroxide ion, (1) an oxide selected from silicon oxide, germanium oxide and mixtures thereof (2) an oxide selected from aluminum oxide, gallium oxide, iron oxide, boron oxide and mixtures thereof (3) and a structure directing agent selected from N,N,N-trialkyl-1-adamantanammonium and N,N,N-trialkyl-2-adamantanammonium cations.

SSZ-25 is prepared from a reaction mixture comprising, in terms of mole ratios, the following:

| | Typical | Exemplary |
|---|---|---|
| $YO_2/X_2O_3$ | 20 to 200 | 30 to 100 |
| $OH^-/YO_2$ | 0.10 to 1.0 | 0.20 to 0.40 |
| $Q/YO_2$ | 0.15 to 0.50 | 0.15 to 0.30 |
| $M^+/YO_2$ | 0.05 to 0.30 | 0.15 to 0.30 |
| $H_2O/YO_2$ | 20 to 300 | 35 to 60 |
| $Z/YO_2$ | 0 to 1.0 | 0.20 to 0.40 |

wherein Y is selected from silicon, germanium and mixtures thereof; X is selected from aluminum, gallium, iron, boron and mixtures thereof; Q is a structure directing agent selected from N,N,N-trialkyl-1-adamantanammonium and N,N,N-trialkyl-2-adamantanammonium cations; M is an alkali metal, such as sodium or potassium; and Z is an amine component comprising at least one amine chosen from amines having from 1 to 8 carbon atoms, ammonium hydroxide and mixtures thereof.

The organic adamantane compound which acts as a source of the adamantane quaternary ammonium cation employed can provide hydroxide ion. When using the adamantane quaternary ammonium hydroxide as a template, it has been found that purer forms of SSZ-25 can be prepared when there is an excess of the adamantane quaternary ammonium hydroxide compound present relative to the amount of alkali metal hydroxide and that when the $OH^-/SiO_2$ molar ratio is greater than 0.40, then the $M^+/SiO_2$ molar ratio should be less than 0.20.

Typical sources of aluminum oxide include aluminates, alumina, and aluminum compounds such as $AlCl_3$, $Al_2(SO_4)_3$, $Al(OH)_3$, kaolin clays, and other zeolites. An example of the source of aluminum oxide is LZ-210 zeolite (a type of Y zeolite).

Typical sources of silicon oxide include silicates, silica hydrogel, silicic acid, colloidal silica, fumed silica, tetraalkyl orthosilicates and silica hydroxides. Gallium, iron, boron and germanium can be added in forms corresponding to their aluminum and silicon counterparts. Salts, particularly alkali metal halides such as sodium chloride, can be added to or formed in the reaction mixture.

The reaction mixture can optionally comprise an amine component (Z) comprising at least one amine chosen from amines having from 1 to 8 carbon atoms, ammonium hydroxide and mixtures thereof. Non-limiting examples of these amines include isopropylamine, isobutylamine, n-butylamine, piperidine, 4-methylpiperidine, cyclohexylamine, tert-octylamine, cyclopentylamine and mixtures thereof. The use of these amines can permit a reduction in the amount of the structure directing agent used resulting in a significant cost savings. By using the amine component, the amount of the structure directing agent can be reduced to a level below that which is required to fill the micropore volume of the molecular sieve, i.e., an amount less than required to crystallize the molecular sieve in the absence of the amine component. In addition, the use of the amine component can promote faster crystal growth when used in combination with seed crystals. Methods for preparing SSZ-25 using an amine component are disclosed in U.S. Pat. No. 5,785,947.

In practice, SSZ-25 is prepared by a process comprising: (a) preparing an aqueous solution comprising (1) an oxide selected from silicon oxide, germanium oxide and mixtures thereof, (2) an oxide selected from aluminum oxide, gallium oxide, iron oxide, boron oxide and mixtures thereof, (3) a structure directing agent selected from N,N,N-trialkyl-1-adamantanammonium and N,N,N-trialkyl-2-adamantanammonium cations having an anionic counter-ion which is not detrimental to the formation of SSZ-25 and (4) an alkali metal cation; (b) maintaining the aqueous solution under conditions sufficient to form crystals of SSZ-25; and (c) recovering the crystals of SSZ-25.

The reaction mixture is maintained at an elevated temperature until the crystals of the SSZ-25 are formed. The hydrothermal crystallization is usually conducted under autogenous pressure, at a temperature between 100° C. and 200° C., typically between 135° C. and 180° C. The crystallization period is usually greater than 1 day and typically from about 5 days to about 10 days. The molecular sieve may be prepared using mild stirring or agitation.

During the hydrothermal crystallization step, the SSZ-25 crystals can be allowed to nucleate spontaneously from the reaction mixture. The use of SSZ-25 crystals as seed material can be advantageous in decreasing the time necessary for complete crystallization to occur. In addition, seeding can lead to an increased purity of the product obtained by promoting the nucleation and/or formation of SSZ-25 over any undesired phases. When used as seeds, SSZ-25 crystals are added in an amount between 0.1 and 10% of the weight of the oxide selected from silicon oxide, germanium oxide and mixtures thereof that is used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-25 crystals. The drying step can be performed at atmospheric pressure or under vacuum.

SSZ-25 has a composition, as-synthesized (i.e. prior to removal of the SDA from the SSZ-25) and in the anhydrous state, comprising the following (in terms of mole ratios of oxides): (0.1 to 2) Q: (0 to 1.0) Z: (0.1 to 2.0) M: $X_2O_3$: (20 to 200) $YO_2$ wherein Q is a structure directing agent selected from N,N,N-trialkyl-1-adamantanammonium and N,N,N-trialkyl-2-adamantanammonium cations; Z is an amine component comprising at least one amine chosen from amines having from 1 to 8 carbon atoms, ammonium hydroxide and mixtures thereof; M is an alkali metal cation; X is selected from aluminum, gallium, iron, boron and mixtures thereof; and Y is selected from silicon, germanium and mixtures thereof. As prepared, the $YO_2$:$X_2O_3$ mole ratio is typically in the range of 30 to about 100. In one embodiment, SSZ-25 is an aluminosilicate wherein X is aluminum and Y is silicon.

SSZ-25 can be characterized by its X-ray diffraction pattern. SSZ-25, as-synthesized, has a crystalline structure whose X-ray powder diffraction pattern exhibits the characteristic lines shown in Table 1.

TABLE 1

As-Synthesized SSZ-25

| 2 Theta[a] (degrees) | d-Spacing (nm) | Relative Integrated Intensity (%)[b] |
|---|---|---|
| 3.05 | 2.90 | M |
| 6.42 | 1.377 | VS |
| 7.18 | 1.231 | VS |
| 7.88 | 1.122 | S |
| 9.62 | 0.919 | S |
| 15.75 | 0.563 | M |
| 19.37 | 0.458 | S |
| 22.57 | 0.394 | S |
| 23.05 | 0.386 | M |
| 26.03 | 0.342 | VS |
| 26.85 | 0.332 | M |

[a]±0.20

[b]The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

Crystalline SSZ-25 can be used as-synthesized, but preferably will be thermally treated (calcined). Usually, it is desirable to remove the alkali metal cation (if any) by ion exchange and replace it with hydrogen, ammonium, or any desired metal ion.

After calcination, the X-ray powder diffraction pattern for SSZ-25 exhibits the characteristic lines shown in Table 2 below.

TABLE 2

Calcined SSZ-25

| 2 Theta[a] (degrees) | d-Spacing (nm) | Relative Integrated Intensity (%)[b] |
|---|---|---|
| 3.4 | 2.55 | W |
| 7.19 | 1.230 | VS |
| 8.04 | 1.100 | S |
| 10.06 | 0.878 | VS |
| 14.35 | 0.617 | M-S |
| 16.06 | 0.551 | W |
| 22.77 | 0.390 | M |
| 23.80 | 0.374 | M |
| 26.08 | 0.342 | VS |

[a]±0.20

[b]The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

The X-ray powder diffraction patterns were determined by standard techniques. The radiation was CuKα radiation. The peak heights and the positions, as a function of 2θ where θ is the Bragg angle were read from the relative intensities of the peaks, and d, the interplanar spacing in nanometers corresponding to the recorded lines, can be calculated.

The variation in the scattering angle (two theta) measurements, due to instrument error and to differences between individual samples, is estimated at ±0.20 degrees. Calcination can result in changes in the intensities of the peaks as compared to patterns of the "as-synthesized" material, as well as shifts in the diffraction pattern.

SSZ-25 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-25 can be extruded before drying, or, dried or partially dried and then extruded.

SSZ-25 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

SSZ-25 can be used for the catalytic reduction of the oxides of nitrogen in a gas stream. Typically, the gas stream also contains oxygen, often a stoichiometric excess thereof. Also, the molecular sieve may contain a metal or metal ions within or on it which are capable of catalyzing the reduction of the nitrogen oxides. Examples of such metals or metal ions include cobalt, copper, platinum, iron, chromium, manganese, nickel, zinc, lanthanum, palladium, rhodium and mixtures thereof.

One example of such a process for the catalytic reduction of oxides of nitrogen in the presence of a zeolite is disclosed in U.S. Pat. No. 4,297,328. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

EXAMPLES

The following examples are given to illustrate the present invention. It should be understood, however, that the invention is not to be limited to the specific conditions or details described in these examples.

Example 1

Synthesis of SSZ-25

4.5 Grams of a 0.67M solution of N,N,N-trimethyl-2-adamantanammonium hydroxide prepared according to Example 2 of U.S. Pat. No. 5,202,014 was mixed with 6 mL of water and 0.103 g of KOH (solid). After dissolution, 2.36 g of LUDOX® AS-30 colloidal silica (30% $SiO_2$) was added with stirring using a magnetic stir bar. Finally, 0.78 g of Nalco 1SJ612 alumina on silica (30% solids, 4% $Al_2O_3$ overall) was added. The reactants were loaded into a Parr 4745 reactor, sealed and loaded onto a rotating spit in a Blue M oven. The reactor was rotated at 30 rpm while being heated at 175° C. for 10 days. The product (after filtration, washing with distilled water, and drying in air and then at 100° C.) was the crystalline material designated SSZ-25.

Example 2

Calcination of SSZ-25

The material from Example 1 was heated in a muffle furnace from room temperature up to 540° C. at a steadily increasing rate over a 7 hour period. The sample was maintained at 540° C. for 4 more hours and then taken up to 600° C. for an additional 4 hours. A 50/50 mixture of air and nitrogen was passed over the molecular sieve at a rate of 20 standard cubic feet per minute during heating.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A process for reduction of oxides of nitrogen contained in a gas stream wherein the process comprises contacting the gas stream with a crystalline molecular sieve having a mole ratio of an oxide selected from silicon oxide, germanium oxide and mixtures thereof to an oxide selected from aluminum oxide, gallium oxide, iron oxide, boron oxide and mixtures thereof greater than about 20:1, and having, after calcination, the X-ray diffraction lines of Table 2:

| Calcined SSZ-25 | | |
|---|---|---|
| 2 Theta[a] (degrees) | d-Spacing (nm) | Relative Integrated Intensity (%)[b] |
| 3.4 | 2.55 | W |
| 7.19 | 1.230 | VS |
| 8.04 | 1.100 | S |
| 10.06 | 0.878 | VS |

-continued

| Calcined SSZ-25 | | |
|---|---|---|
| 2 Theta[(a)] (degrees) | d-Spacing (nm) | Relative Integrated Intensity (%)[(b)] |
| 14.35 | 0.617 | M-S |
| 16.06 | 0.551 | W |
| 22.77 | 0.390 | M |
| 23.80 | 0.374 | M |
| 26.08 | 0.342 | VS |

[(a)] ± 0.20

[(b)] The X-ray patterns provided are based on a relative intensity scale in which the strongest line in the X-ray pattern is assigned a value of 100:
W (weak) is less than 20;
M (medium) is between 20 and 40;
S (strong) is between 40 and 60;
VS (very strong) is greater than 60.

2. The process of claim 1 conducted in the presence of oxygen.

3. The process of claim 1, wherein the molecular sieve contains a metal or metal ions capable of catalyzing the reduction of the oxides of nitrogen.

4. The process of claim 3, wherein the metal is cobalt, copper, platinum, iron, chromium, manganese, nickel, zinc, lanthanum, palladium, rhodium or mixtures thereof

5. The process of claim 1, wherein the gas stream is an exhaust stream of an internal combustion engine.

6. The process of claim 4, wherein the gas stream is an exhaust stream of an internal combustion engine.

* * * * *